United States Patent [19]

Kimura et al.

[11] Patent Number: 4,853,260

[45] Date of Patent: Aug. 1, 1989

[54] OPTICAL DISK AND PROCESS FOR PRODUCING THE SAME

[75] Inventors: Yukio Kimura; Toshikazu Yoshino; Ryutaro Hayashi, all of Saitama, Japan

[73] Assignee: Pioneer Electronic Corporation, Tokyo, Japan

[21] Appl. No.: 171,723

[22] Filed: Mar. 22, 1988

[30] Foreign Application Priority Data

Mar. 23, 1987 [JP] Japan .................................. 62-68711
Mar. 23, 1987 [JP] Japan .................................. 62-68712

[51] Int. Cl.$^4$ .............................................. B05D 3/12
[52] U.S. Cl. ..................................... 427/240; 427/273; 427/277; 427/336; 156/314; 156/654; 156/655; 428/64
[58] Field of Search ................ 428/64, 65; 430/494; 427/240, 273, 277, 336; 156/654–655, 314

[56] References Cited

U.S. PATENT DOCUMENTS

| 4,113,492 | 9/1978 | Sato et al. | 427/336 |
| 4,492,718 | 1/1985 | Mayer et al. | 427/336 |
| 4,518,678 | 5/1985 | Allen | 427/240 |
| 4,685,975 | 8/1987 | Kottman et al. | 427/273 |
| 4,731,620 | 3/1988 | Yabe et al. | 428/65 |

Primary Examiner—Ellis P. Robinson
Assistant Examiner—P. J. Ryan
Attorney, Agent, or Firm—Sughrue, Mion, Zinn, Macpeak & Seas

[57] ABSTRACT

An optical disk includes two disk substrates bound together with a spacer in between and at least one of the substrates has a recording layer facing the inside. Before using the adhesive, the portion of the recording layer in the bonding area is removed so that the adhesive is applied directly between the spacer and a transfer layer which has been formed on top of each substrate. The bonding inside the disk is much stronger and peeling of the disk is prevented.

7 Claims, 3 Drawing Sheets

OPTICAL DISK AND PROCESS FOR PRODUCING THE SAME

BACKGROUND OF THE INVENTION

The present invention relates to an optical disk and a process for producing an optical disk. More particularly, the present invention relates to a process for producing an optical disk of the air sandwich structure in which two disk substrates having a recording layer made of an organic dye film are bound together via a spacer with the recording layer facing inside.

Optical disks of the air sandwich structure type contemplated by the present invention have conventionally been produced by the following steps:

(1) A polyacrylic disk substrate is cleaned and a grooved transfer layer is formed on the cleaned surface. A typical method for forming such a receiving layer consists of dripping a polyacrylic uv curable resin on a grooved metal stamper, super-posing an acrylic disk substrate on the stamper, uniformly spreading the uv curable resin over the substrate, irradiating the film of the resin with ultraviolet radiation to cause its polymerization, and peeling off the substrate from the metal stamper. As shown in FIG. 1(a), this process produces an assembly in which a transfer layer 2 is formed on the disk substrate 1.

(2) In the next step, an organic dye solution conditioned to a predetermined concentration is provided and spin-coated onto the transfer layer 2 to form a recording layer 3 of an organic dye film (FIG. 1(b)).

(3) Two disk substrates having such a recording layer 3 are superposed on each other via a spacer 4 with each recording layer 3 facing inside, and an adhesive agent 5 is applied to that area of each disk substrate which faces the spacer 4, followed by bonding the two disk substrates together to produce an optical disk of the air sandwich structure shown in FIG. 1(c).

As will be apparent from the above, the optical disk produced by the conventional process has an adhesive agent left on each of the recording layers in the area where the disk substrates are bonded to the spacer. Therefore, the overall bonding strength of the disk depends on the strength of adhesion between the polyacrylic base of the disk substrate and the transfer layer, the strength of adhesion between the transfer layer and the recording layer, the bonding strength between the recording layer and the adhesive agent, and also on the bonding strength between the adhesive agent and the spacer. The strength of adhesion between the transfer layer and the recording layer is weaker than the adhesion or bonding in other portions and peeling has frequently occurred at the interface between these layers.

The present invention solves the aforementioned problems of the prior art and the principal object of the invention is to provide a process for producing an optical disk that has an improved strength of adhesion between disk substrates at the area where peeling has often occurred.

SUMMARY OF THE INVENTION

The process of the present invention for producing an optical disk attains the above-stated object by employing the following steps:
 forming a transfer layer on a disk substrate;
 forming a recording layer of an organic dye film on top of the transfer layer by spin coating;
 removing the recording layer of an organic dye film in the bonding area where the disk substrate faces a spacer; and bonding two disk substrates, at least one of which has the recording layer, via the spacer with the recording layer facing inside and with an adhesive agent being applied to the bonding area where the two disk substrates face the spacer.

The process of the present invention differs from the prior art version in that it includes a step in which a portion of the recording layer of an organic dye film is removed before the final step of bonding two disk substrates together. A solvent is sprayed on the bonding area of the disk substrate where it faces the spacer. Alternatively, the solvent may be contained in a cloth and wiped onto the bonding area.

The strength of adhesion that is produced between the two disk substrates which are bonded together with an adhesive agent via the spacer with the recording layer facing inside will depend on the strength of adhesion between the polyacrylic base of each disk substrate and the transfer layer which is similar in nature to the disk substrate, the bonding strength between the transfer layer and the adhesive agent, and also on the bonding strength between the adhesive agent and the spacer. The strength of adhesion attained in the optical disk fabricated according to the present invention is great enough to prevent peeling from occurring in any part of the disk.

According to the present invention, the solvent for removing the unnecessary recording layers from the substrate should be selected from solvents that have suitable characteristics in accordance with the material of the substrate and the recording material. Namely, in the step of removing the recording layer, it is necessary that the solvent impregnate the recording layers located on inside and outside peripheral portions of the substrate. However, the solvent has to have a rapid drying property to avoid the phenomenon of the solvent invading the substrate. Also, the solvent should be prevented from invading the remaining layer. For example, the solvent should be selected from the group including ketone-series solvents when the recording layer is made of an organic dye such as a cyanine-series dye and the substrate is made of acrylic resin.

DESCRIPTION OF THE PREFERRED EMBODIMENTS

An embodiment of the present invention is hereunder described with reference to FIGS. 2 and 3.

Figure 2:
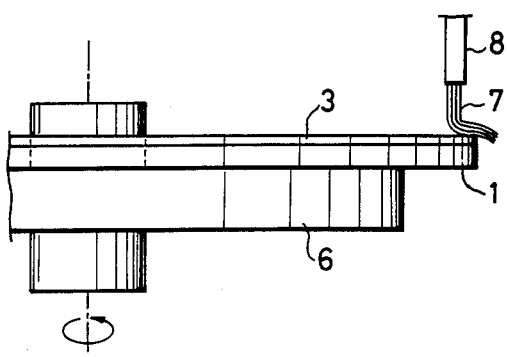
FIG. 2 illustrates a removing step of the process for fabricating an optical disk according to the present invention.

FIG. 2 illustrates the essential step of the process for fabricating an optical disk according to the present invention, in which the recording layer of an organic dye film is removed from the peripheral edge of each disk substrate where it is to be bonded to the other disk substrate.

Figure 1A:
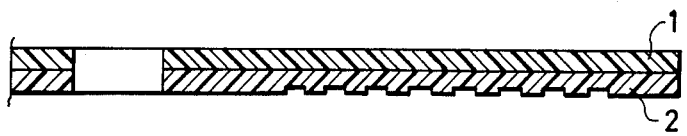
FIGS. 1(a), 1(b) and 1(c) are diagrammatic representation of the prior art process for producing an optical disk.
Figure 1B:
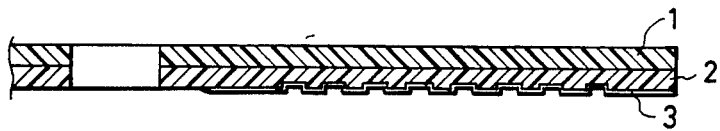
Figure 1C:
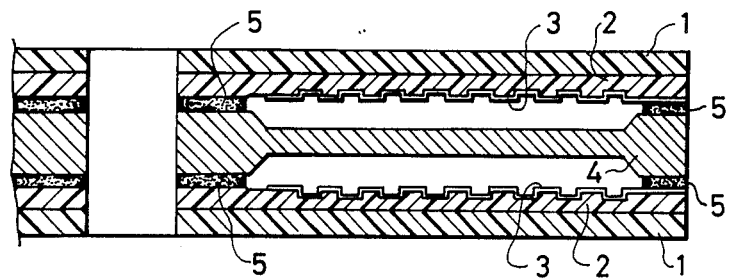

In a process for producing an optical disk according to one embodiment of the present invention, the steps of forming an image-receiving or transfer layer on a disk substrate, forming a recording layer, and bonding two disk substrates together are essentially the same as those described with reference to FIG. 1 and need not be explained in detail. The characteristic part of the process of the present invention lies in the third step in which the recording layer of an organic dye film is removed from the bonding area of the disk substrate where it faces the spacer. This characteristic removing step is hereunder described with referenece to FIG. 2. This removing step starts with setting disk substrate 1 on a turntable 6 with the recording layer 3 facing up. While the turntable 6 is rotating, a solvent stream 7 is allowed to flow out of a solvent supply pipe 8 onto the peripheral edge of the disk substrate 1 (i.e., the area at which two disk substrates are to be bonded together), thereby washing off the recording layer 3 from that area. In this step of removing the recording layer 3 of an organic dye film from the bonding area, or the peripheral edge, of the disk substrate 1, the turntable 6 keeps rotating to produce a centrifugal force that allows the supplied solvent to flow outwardly, rather than inwardly, on the disk substrate 1, thereby permitting the recording layer 3 of an organic dye film to be removed only from the bonding area on the circumference of the disk substrate 1.

The disk substrate 1 having no recording layer in its bonding area is then bonded to the other disk substrate which has been treated by the same process as described above.

Figure 3:
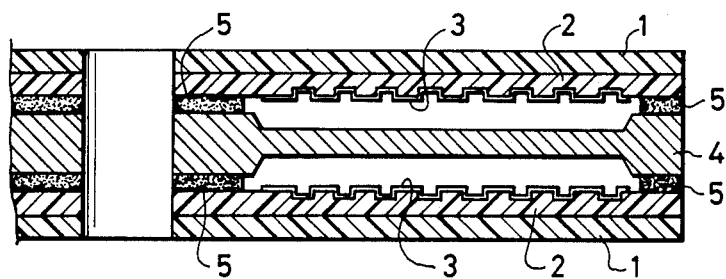
FIG. 3 is a sectional view showing the essential part of an optical disk fabricated by the process of the present invention.

The structure of an optical disk that is fabricated by the process of the present invention is depicted in FIG. 3. As shown, the recording layer 3 has been removed from the area of bonding between the disk substrate 1 and the spacer, which are directly bonded to each other. The adhesion between these two members is strong enough to prevent peeling.

Figure 4:
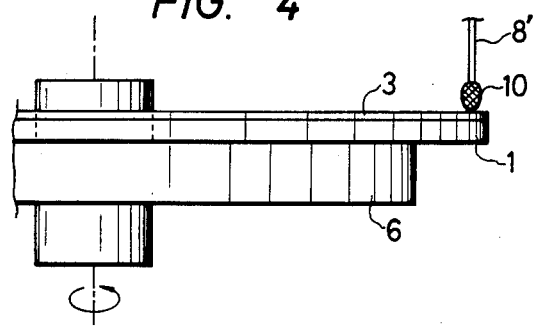
FIG. 4 is a view similar to FIG. 2 showing another removing step.

Although in the foregoing method, a solvent stream is applied to the peripheral edge of the disc, it is possible to use a removing means 8' having cloth 10 containing a solvent as shown in FIG. 4. It is preferable to spin the disk substrate during the removing step.

The recording layer 3 on the optical disk of the present invention is formed of an organic dye film and can be readily removed with a solvent stream or a cloth containing the solvent. Although the process of the present invention has an additional step than the conventional process, the additional step (washing step) is simple and improves the reliability of the optical disk produced.

As described above, the optical disk produced by the present invention has two disk substrates bonded together with an adhesive agent via a spacer with the recording layer facing inside. The strength of adhesion between the two disk substrates depends on the strength of adhesion between the polyacrylic base of each disk substrate and the transfer layer which is similar in nature to the disk substrate, the bonding strength between the transfer layer and the adhesive agent, and also on the bonding strength between the adhesive agent and the spacer. The strength of bonding attained in this optical disk is great enounght to prevent peeling from occurring in any part of the disk, thereby ensuring high reliability of the final product.

We claim:

1. A process for producing an optical disk laminate from first and second optical disks each having a transfer layer formed on a substrate, with at least one of said first and second optical disks further having a recording layer formed on its transfer layer, said method comprising the steps of:
   removing the recording layer in a bonding area; and
   bonding said two disks to one another via a spacer with the recording layer facing inside and with an adhesive agent being applied to the bonding area where the two disks face the spacer.

2. The process of claim 1, wherein said removing step includes solvent-washing said recording layer.

3. The process of claim 1, wherein said removing step includes using a cloth containing a solvent.

4. The process of claim 1, wherein said removing step includes spinning said disk substrate.

5. The process of claim 1, wherein said recording layer is of an organic dye film.

6. The process of claim 1, wherein the removing step is implemented using a solvent having a rapid drying characteristic.

7. The process of claim 6, wherein the recording layer is made of an organic dye, the substrate is made of acrylic resin, and the solvent is a ketone-series solvent.

* * * * *